US009307700B1

(12) United States Patent
Schmitt

(10) Patent No.: US 9,307,700 B1
(45) Date of Patent: Apr. 12, 2016

(54) HEADSTONE BRACKET WITH FLAG, FLOWER AND WREATH HOLDERS

(71) Applicant: Sheri Jean Schmitt, Hallettsville, TX (US)

(72) Inventor: Sheri Jean Schmitt, Hallettsville, TX (US)

( * ) Notice: Subject to any disclaimer, the term of this patent is extended or adjusted under 35 U.S.C. 154(b) by 0 days.

(21) Appl. No.: 14/639,274

(22) Filed: Mar. 5, 2015

(51) Int. Cl.

| | |
|---|---|
| ***A47G 7/00*** | (2006.01) |
| ***A01G 5/04*** | (2006.01) |
| ***G09F 17/00*** | (2006.01) |
| ***A47G 7/04*** | (2006.01) |
| ***A61G 99/00*** | (2006.01) |
| ***E04H 13/00*** | (2006.01) |

(52) U.S. Cl.
CPC *A01G 5/04* (2013.01); *A47G 7/044* (2013.01); *A61G 99/00* (2013.01); *E04H 13/001* (2013.01); *G09F 17/00* (2013.01)

(58) Field of Classification Search
CPC combination set(s) only.
See application file for complete search history.

(56) References Cited

U.S. PATENT DOCUMENTS 1,596,812 A * 8/1926 Curtis .................... A61G 17/04 211/119.002
2,506,119 A * 5/1950 Tregear ................... A47J 47/16 248/200
3,145,847 A * 8/1964 Clement ............... E04H 13/003 211/107
3,164,343 A * 1/1965 Cucullo ................. A47G 7/044 248/218.4
D204,552 S * 4/1966 Reynolds ..................... D11/143
3,310,911 A * 3/1967 Boser ..................... A47G 7/044 248/27.8
3,978,612 A * 9/1976 Young .................... A47G 7/045 211/96

(Continued)

*Primary Examiner* — Monica Millner

(74) *Attorney, Agent, or Firm* — Crossley & Stevenson IP Law

(57) ABSTRACT

A headstone bracket devised to fit lengthwise over a headstone including a bracket having a center section which has either a single static piece or parallel slidingly engageable upper and lower portions adjustable to headstone upper side length and a leg extending from a bottom side of each upper and lower portion. A slot disposed on the upper portion slidingly receives a bolt disposed on the lower portion therethrough. A securing body, such as a finial, threadingly engages the bolt and a lock washer is removably attachable to the securing body between the bolt to secure the upper and lower portions in a selected lock position. At least one of a flag holder and a flower pot-supporting annular ring disposed on an outer end one of the upper portion and the lower portion, and a wreath-supporting hook disposed on an external end of one of the legs is provided.

1 Claim, 3 Drawing Sheets

(56) References Cited

U.S. PATENT DOCUMENTS 4,363,459 A * 12/1982 Holzer .................... E06B 9/323 248/257
4,640,045 A 2/1987 Nesbitt et al.
4,709,891 A * 12/1987 Barnett .................... G09F 7/18 248/214
D305,299 S * 1/1990 Freeman .................... 248/214
D332,762 S * 1/1993 McCafferty, Jr. ............ D11/164
5,368,266 A * 11/1994 Allen .................... E04H 13/003 108/47
5,368,267 A * 11/1994 Howard .................... A47G 7/044 248/208
D359,629 S * 6/1995 Korkowski .................... D11/164
5,456,046 A * 10/1995 Vitalune .............. A47G 21/167 248/214
5,687,515 A * 11/1997 Rodrigues ............. E04H 13/003 40/124.5
5,738,319 A * 4/1998 Grassi .................... A47G 7/044 248/215
5,822,918 A * 10/1998 Helfman ................ A47H 27/00 248/231.41
6,168,125 B1 * 1/2001 Winger .................. A47G 7/044 248/228.3
6,311,851 B1 * 11/2001 Knudsen, Sr. ........... A01G 5/04 211/13.1
6,324,784 B1 12/2001 Bina
6,418,676 B1 * 7/2002 Olsen .................... E04H 13/003 248/27.8
6,439,522 B1 * 8/2002 Yeh ...................... A47B 96/061 248/228.6
6,688,040 B1 2/2004 Yang
7,305,794 B1 * 12/2007 Cantrell ................... A01G 5/04 248/499
D568,727 S * 5/2008 Walker ........................... D8/380
7,640,694 B1 * 1/2010 Cantrell ................... A01G 5/04 27/1
7,887,017 B2 * 2/2011 Moran ...................... B44C 5/00 248/215
7,992,833 B1 * 8/2011 Goodman .......... A47G 25/0614 248/298.1
D678,043 S * 3/2013 Lu .................................. D8/373
8,523,118 B2 * 9/2013 Weder ...................... A01G 5/04 248/151
9,107,526 B2 * 8/2015 Rife ..................... A47G 29/083
2003/0137832 A1 * 7/2003 Little .................... E04H 13/003 362/183
2005/0246951 A1 * 11/2005 Taylor .................... A47G 7/042 47/41.1
2006/0179727 A1 * 8/2006 Berg ..................... E04H 13/001 52/103
2008/0308695 A1 * 12/2008 Lambert ................ A47G 7/044 248/226.11
2011/0036001 A1 * 2/2011 Aker ...................... A47G 7/044 47/41.12

* cited by examiner

HEADSTONE BRACKET WITH FLAG, FLOWER AND WREATH HOLDERS

BACKGROUND OF THE INVENTION

Various types of devices for displaying flags and flower arrangements on headstones are known in the prior art. Some of the known devices are width adjustable and either support flower arrangements or include holders for decorative objects such as a planter box Other known devices include a flower vase with a base that attaches to a headstone with adhesive tape and a cage with a foam block on a base thereof which employs straps to attach the base width-wise to a headstone. A flower stem receiving block attached to a headstone with bands that extend between hooks in the block and eyelets in the upper edge of the headstone is also known. A combination cemetery vase and flag holder adapter that rotatably attaches to a mounting ring of an invertible type cemetery vase via a lug mechanism is also known. However, what is needed is an L-shaped headstone U-shaped bracket that fits lengthwise over a headstone from a right side to a left side thereof and includes various combinations of flag, flower and wreath holders.

FIELD OF THE INVENTION

The present invention relates to headstone flag and flower display devices, and more particularly, to a headstone bracket with flag, flower and wreath holders.

SUMMARY OF THE INVENTION

The general purpose of the present headstone bracket with flag, flower and wreath holders, described subsequently in greater detail, is to provide a headstone bracket with flag, flower and wreath holders which has many novel features that result in a headstone bracket with flag, flower and wreath holders which is not anticipated, rendered obvious, suggested, or even implied by prior art, either alone or in combination thereof.

To accomplish this, the present headstone bracket with flag, flower and wreath holders is device to fit lengthwise over a headstone. The device includes an L-shaped bracket having a center section with parallel upper and lower portions which are slidingly securing engageable, thus permitting the length of the bracket center section to adjust to the length of the headstone upper side. A leg extends at a right angle from a bottom side proximal an outer end of each of the respective upper and lower portions. The center section can alternately be a single static piece.

For the sliding securable engagement of the upper and lower portions, a bolt is disposed on the lower portion proximal the inner end and a slot longitudinally disposed on the upper portion slidingly receives the bolt therethrough in a selected lock position. A securing body, such as a finial, has a lower end which is threadingly engageable to the bolt. A lock washer is removably attachable to the securing body between the bolt in the selected lock position and the lower end. When the bolt is in the selected lock position, the bracket center section has a length substantially the same as a length of the headstone upper side, and each of the legs of the bracket directly abut the respective right and left sides of the headstone.

In addition, at least one of a flag holder, an annular ring configured to support an upper periphery of a flower pot thereon to support the flower pot in an upright position, and an upwardly directed hook configured to support a wreath in an upright position thereon, or a combination thereof is disposed on the outer end of a respective one of the upper portion and the lower portion and an external end of a respective one of the legs, respectively. The flag holder includes a vertical aperture disposed in one of the upper and lower portions between the respective leg and outer end. A housing, disposed on an external end of one of the legs, has a closed lower end, a continuous cavity vertically disposed therein, and an open upper end accessing the cavity. The cavity is in direct vertical alignment with the aperture.

Thus has been broadly outlined the more important features of the present headstone bracket with flag, flower and wreath holders so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
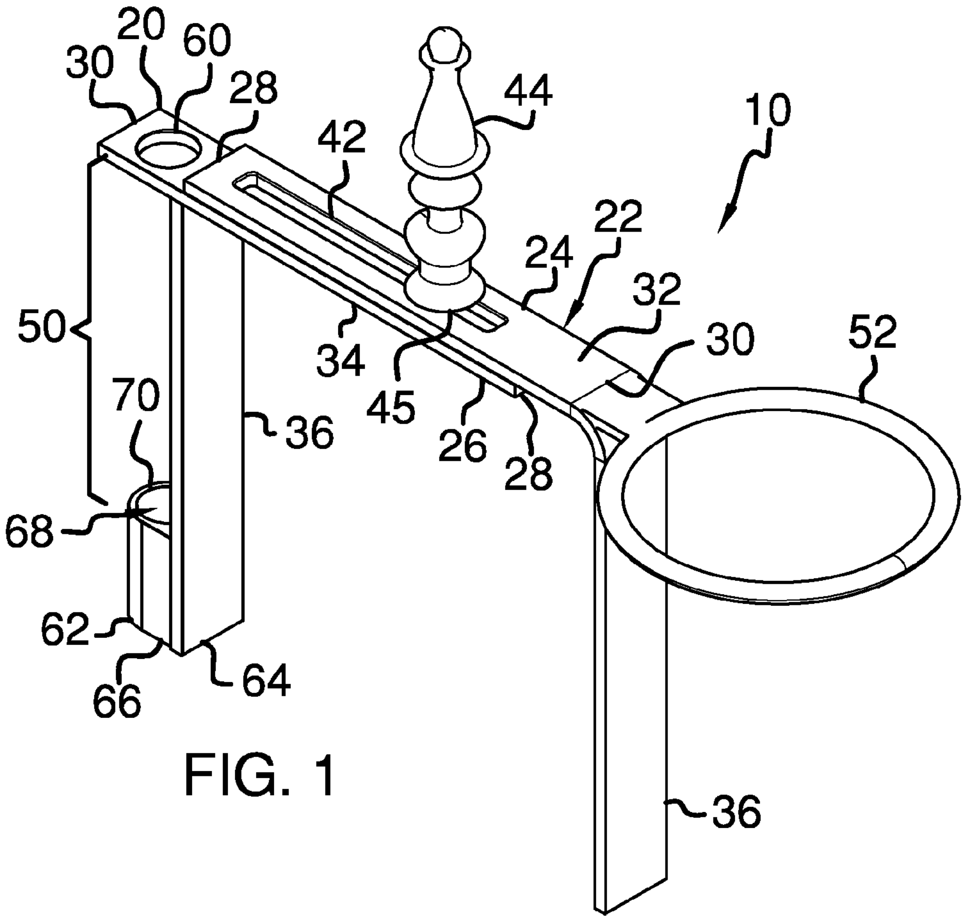
FIG. 1 is an isometric view with a securing body, a flag holder, and a plant holder.
Figure 2:
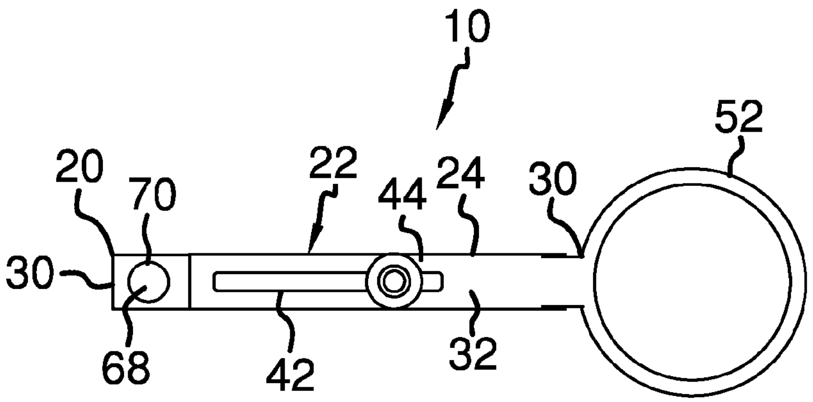
FIG. 2 is a top plan view with the securing body, the flag holder, and the plant holder.
Figure 3:
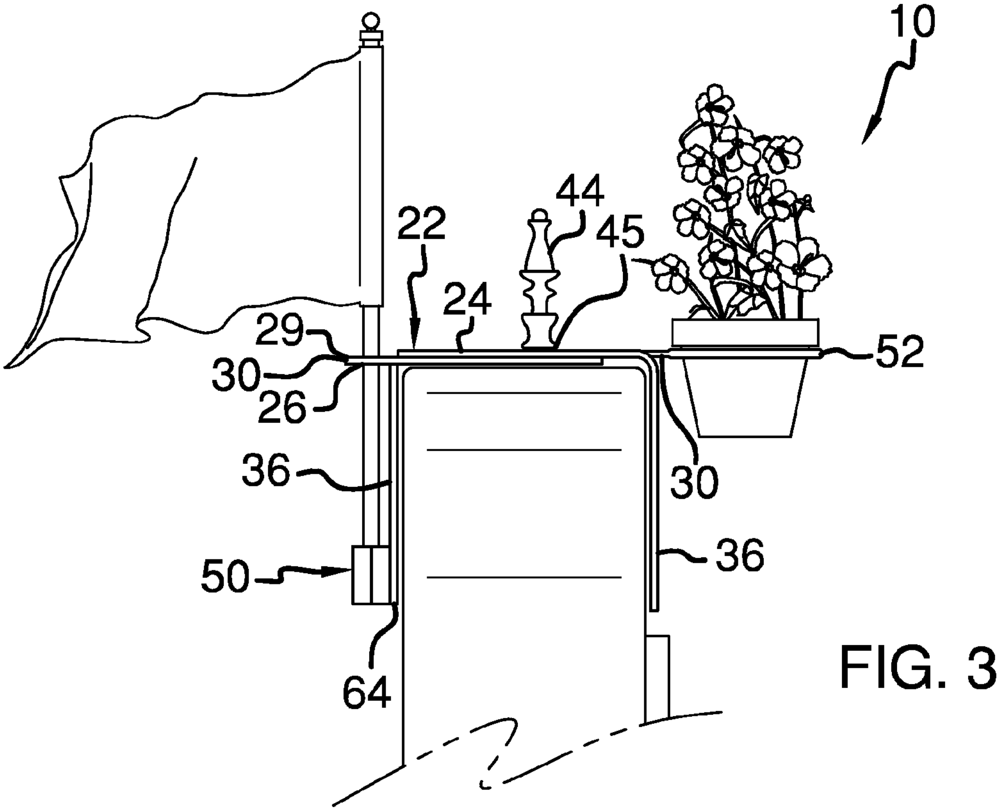
FIG. 3 is an in-use side elevation view with the securing body, the flag holder, and the plant holder.
Figure 4:
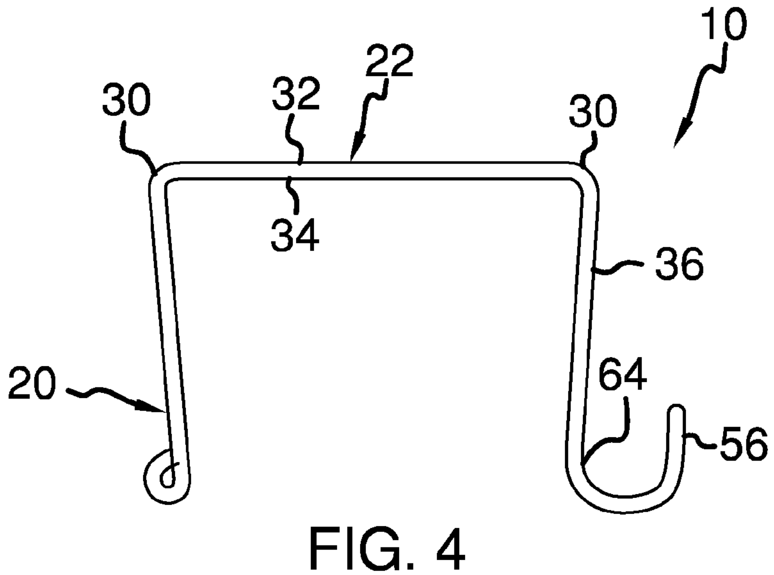
FIG. 4 is a front elevation view with only a wreath holder.
Figure 5:
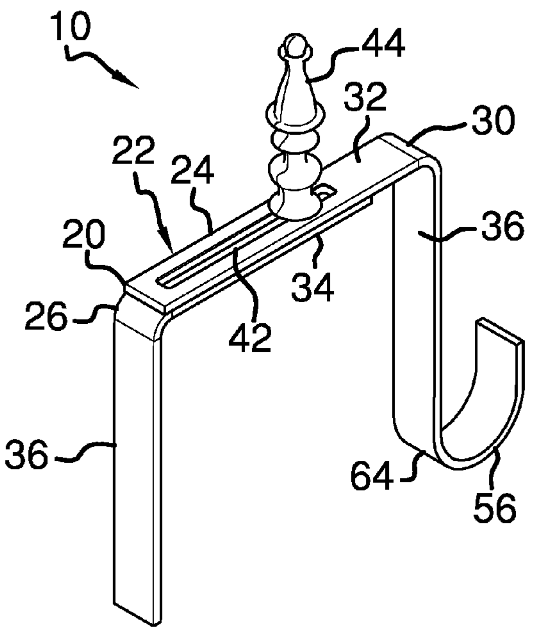
FIG. 5 is an isometric view with the securing body and the wreath holder.
Figure 6:
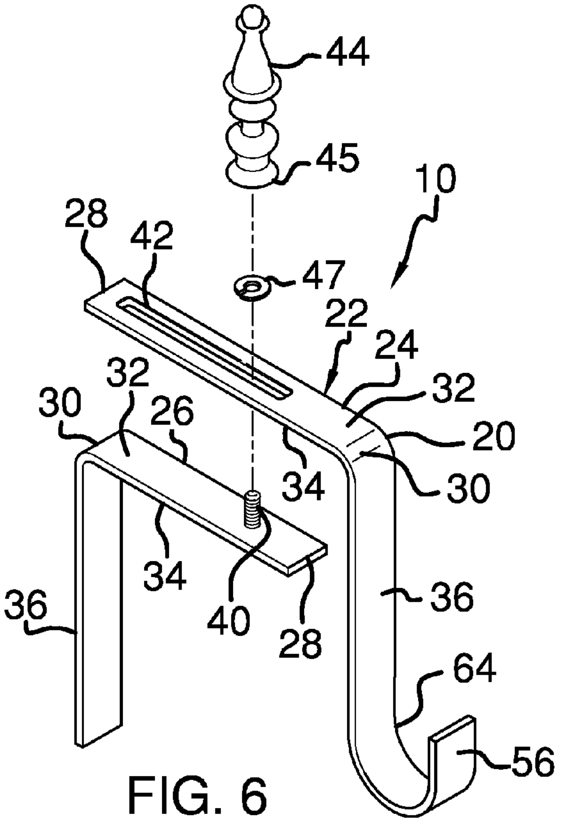
FIG. 6 is an exploded isometric view with the securing body and the wreath holder.

With reference now to the drawings, and in particular FIGS. 1 through 6 thereof, an example of the instant headstone bracket with flag, flower and wreath holders employing the principles and concepts of the present headstone bracket with flag, flower and wreath holders and generally designated by the reference number 10 will be described.

Referring to FIGS. 1 through 6, the present headstone bracket with flag, flower and wreath holders 10 devised to fit over and along a length of a headstone is illustrated. The device 10 includes an L-shaped bracket 20 configured to fit over a headstone. The bracket 20 has a center section 22. The bracket 20 is length adjustable by providing a center section 22 having an upper portion 24 and a lower portion 26. Each of the upper and lower portions 24, 26 has an inner end 28, an outer end 30, a top side 32, and a bottom side 34. The lower portion 26 is disposed directly adjacent the upper portion 24 bottom side 34 in a position parallel to the upper portion 24. The upper and lower portions 24, 26 are slidingly securably engaged to each other. The bracket 20 also includes a pair of legs 36 with one leg 36 extending at a right angle from the bottom side 34 proximal the outer end 30 of each of the respective upper and lower portions 24, 26. Each of the legs 36 has a length at least one-half a height of the headstone. The bracket 20 is configured to adjust to a length of an upper side of a headstone from a right side to a left side of the headstone. Alternately, the center section 22 can be a single piece with the bracket 20 being static, rather than length adjustable.

With respect to the sliding securable engagement of the upper and lower portions 24, 26, a bolt 40 is disposed on the lower portion 26 proximal the inner end 28. A slot 42 is longitudinally disposed on the upper portion 24 from proximal the outer end 30 to proximal the inner end 28. A securing body 44, such as a finial, has a lower end 45 which is threadingly engageable to the bolt 40. The slot 42 slidingly receives the bolt 40 therethrough in a selected lock position. A lock washer 47 is removably attachable to the securing body 44 between the bolt 40 in the selected lock position and the lower end 45. When the bolt 40 is in the selected lock position, the bracket 20 center section 22 has a length slightly longer than a length of the headstone upper side, and each of the legs 36 of the bracket 20 directly abut the respective right and left sides of the headstone.

In addition, at least one of a flag holder 50, an annular ring 52, and an upwardly directed hook 56 or a combination thereof is disposed on the outer end 30 of a respective one of the upper portion 24 and the lower portion 26 and an external end 64 of one of the legs, respectively. The flag holder 50 includes a vertical aperture 60 is disposed in one of the upper portion 24 and the lower portion 26 between the respective leg 36 and outer end 30. A housing 62, which is disposed on the external end 64 of one of the legs 36, has a closed lower end 66, a continuous cavity 68 vertically disposed therein, and an open upper end 70 accessing the cavity 68. The cavity 68 is in direct vertical alignment with the aperture 60.

The flag holder 50 is configured to receive a flagstaff of a flag therein to support a flag in an upright position directly adjacent the respective one of the right side and the left side of the headstone. The annular ring 52 is configured to support an upper periphery of a flower pot thereon to support the flower pot in an upright position. The hook 56 has a length and a bottom hook width configured to support a wreath in an upright position thereon.

What is claimed is:

1. A headstone bracket consisting of:

a length-adjustable bracket configured to fit over a headstone, the bracket having:

a center section an upper portion and a lower portion, each of the upper and lower portions having an inner end, an outer end, a top side, and a bottom side, wherein the lower portion disposed directly adjacent the upper portion bottom side in a position parallel to the upper portion, the upper and lower portions being slidingly securably engaged to each other;

a pair of legs, one leg extending at a right angle from the bottom side proximal the outer end of each of the respective upper and lower portions; and a single hook disposed directly on an external end of one of the legs;

a single bolt disposed on the lower portion proximal the inner end;

a single slot longitudinally disposed solely on the upper portion from proximal the outer end to proximal the inner end;

a finial having a lower end threadingly engageable to the bolt;

wherein the slot slidingly receives the bolt therethrough in a selected lock position;

a lock washer removably attachable to the finial lower end between the bolt in the selected lock position and the lower end;

wherein when the bolt is in the selected lock position, the bracket center section has a length substantially the same as a length of the headstone upper side from a right side to a left side of the headstone, and each of the legs of the bracket directly abut the respective right and left sides of the headstone;

wherein each of the legs has a length at least one-half a height of the headstone.

* * * * *